United States Patent [19]

Fukao et al.

[11] Patent Number: 5,681,062

[45] Date of Patent: Oct. 28, 1997

[54] TUBULAR JOINT

[75] Inventors: Hitoshi Fukao; Hideo Matsuura, both of Komaki, Japan

[73] Assignee: Kunimorikagaku Ltd., Aichen-ken, Japan

[21] Appl. No.: 692,384

[22] Filed: Aug. 5, 1996

[30] Foreign Application Priority Data

Sep. 27, 1995 [JP] Japan ................... 7-274714
Oct. 9, 1995 [JP] Japan ................... 7-289415

[51] Int. Cl.$^6$ ................................. F16L 17/02
[52] U.S. Cl. ................. 285/340; 285/369; 285/423; 285/906
[58] Field of Search ..................... 285/369, 340, 285/423, 906

[56] References Cited

U.S. PATENT DOCUMENTS

| 4,146,254 | 3/1979 | Turner et al. ........... 285/369 X |
| 4,421,347 | 12/1983 | Kantor ..................... 285/369 |

FOREIGN PATENT DOCUMENTS

| 60310 | 9/1982 | European Pat. Off. ......... 285/369 |
| 1236907 | 6/1971 | United Kingdom .............. 285/369 |
| 1312782 | 4/1973 | United Kingdom .............. 285/369 |
| 1477074 | 6/1977 | United Kingdom .............. 285/369 |
| 2075141 | 11/1981 | United Kingdom .............. 285/369 |

Primary Examiner—Dave W. Arola
Attorney, Agent, or Firm—Frishauf, Holtz, Goodman, Langer & Chick

[57] ABSTRACT

A tubular joint including at least a pair of connection ports having an inner diameter substantially equivalent to an outer diameter of tubes to be connected, and a tubular connection part connecting the connection ports to each other. The connection ports each have a sealing member formed integrally thereon by extruding elastomer resin into a first recess formed around an axial line on an inner circumferential face of the connection ports, and the connection ports each have a fall-out preventing member coupled to an end part of the connection ports. The fall-out preventing member includes a ring-like member having an outer diameter sized for insertion into the connection ports, and a number of claws having leading edges located in a second recess formed around the axial line on the inner circumferential face of the connection ports and extending toward a center of the connection ports. When a tube is inserted into one of the connection ports, the claws slidably contact an outer circumferential face of the tube and are elastically deformed in a diameter-swelling direction to thereby enable insertion of the tube, whereupon the claws are brought into contact with the outer circumferential face of the tube due to an elasticity return pressure to thereby prevent the inserted tube from falling out of the one of the connection ports. At the same time, the sealing member is simultaneously brought into contact with the outer circumferential face of the inserted tube to thereby achieve an airtight coupling between the inserted tube and the one of the connection ports.

6 Claims, 15 Drawing Sheets

TUBULAR JOINT

BACKGROUND OF THE INVENTION 1. (Field of the Invention)

The present invention relates to a tubular joint which connects tubes or pipes to each other.

2. (Prior and Related Arts of the Invention)

For example, in a case where synthetic resin tubes (pipes) are connected to each other, a tubular joint having a connection port, whose inner diameter is almost equal to the outer diameter of said tube at both ends thereof, is inserted to an end on which an adhesive agent is coated and is fixed thereon. The tube and tubular joints thus connected are made airtight by the adhesive agent inserted therebetween.

However, when attempting to obtain airtightness with an adhesive agent, such an adhesive agent must be almost uniformly coated on the end part of the tube and the connection port of the tubular joint. This is very cumbersome. In particular, if the tubes are intended to be disposed in a narrow space such as behind ceilings or inside walls, it is very difficult to coat an adhesive agent thereon, and the working efficiency is very bad.

When attaching a tubular joint to a tube, part of the coated adhesive agent is peeled off to cause the coating thereof not to be uniform or sufficient, whereby the airtightness is made incomplete and the connection is not made tough.

In order to solve the abovementioned shortcomings and drawbacks, a ring-like sealing member may be attached to the inner circumferential face of a connection port. However, in this case, the work required to attach the sealing members needs much manpower and time, thereby causing the production cost to be increased.

Furthermore, in a case of connecting tubes which are separated or spaced from each other in a case where the axial directions of the tubes are different from each other, it is necessary to use a tubular joint bent in advance at an appointed angle, and various kinds of tubular joints having different bent angles must be prepared. In addition, it is necessary to bend tubular joints in compliance with the arranging states of tubes or pipes to be connected at a work site. Therefore, the working efficiency is reduced and much time is required at the working site.

SUMMARY OF THE INVENTION

The present invention was developed in order to solve the abovementioned shortcomings and drawbacks, and it is therefore an object of the invention to provide a tubular joint by which tubes or pipes are securely connected in a short time even in a narrow space, thereby causing the working site efficiency to be much improved.

It is another object of the invention to provide a tubular pipe by which water or liquid leakage at a connection port is reliable and secure and the connection state is securely maintained for a longer period of time.

It is still another object of the invention to provide a tubular pipe which does not require a sealing material to be attached at connection ports, thereby causing the production cost to be much decreased.

It is a further object of the invention to provide a single type of tubular joint by which various tubes or pipes in different arranged states can be connected to each other.

BRIEF DESCRIPTION OF THE DRAWINGS

Other advantages of the invention will be readily appreciated as the same becomes better understood by reference to the following detailed description when considered in connection with the accompanying drawings, wherein.

DESCRIPTION OF PREFERRED EMBODIMENTS OF THE INVENTION

Preferred Embodiment 1

Figure 1:
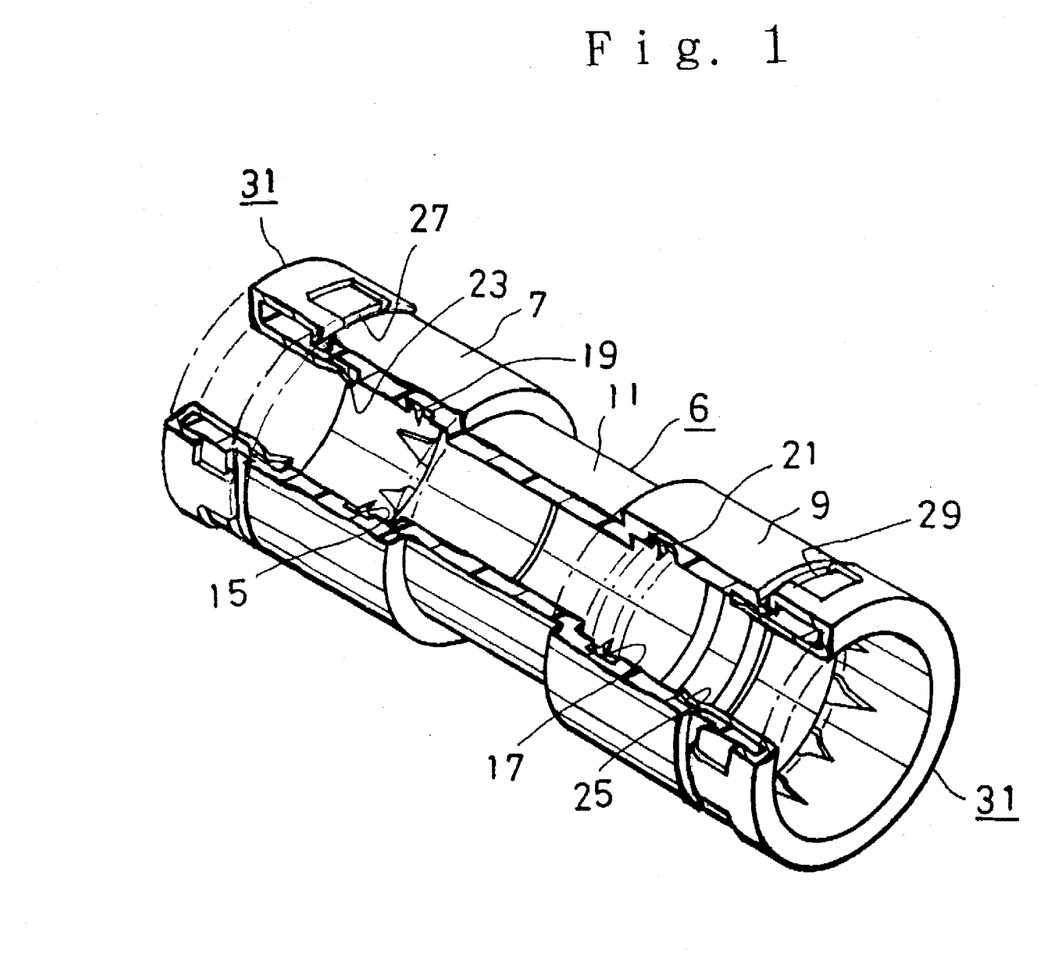
FIG. 1 is a partially broken perspective view of a tubular joint.
Figure 2:
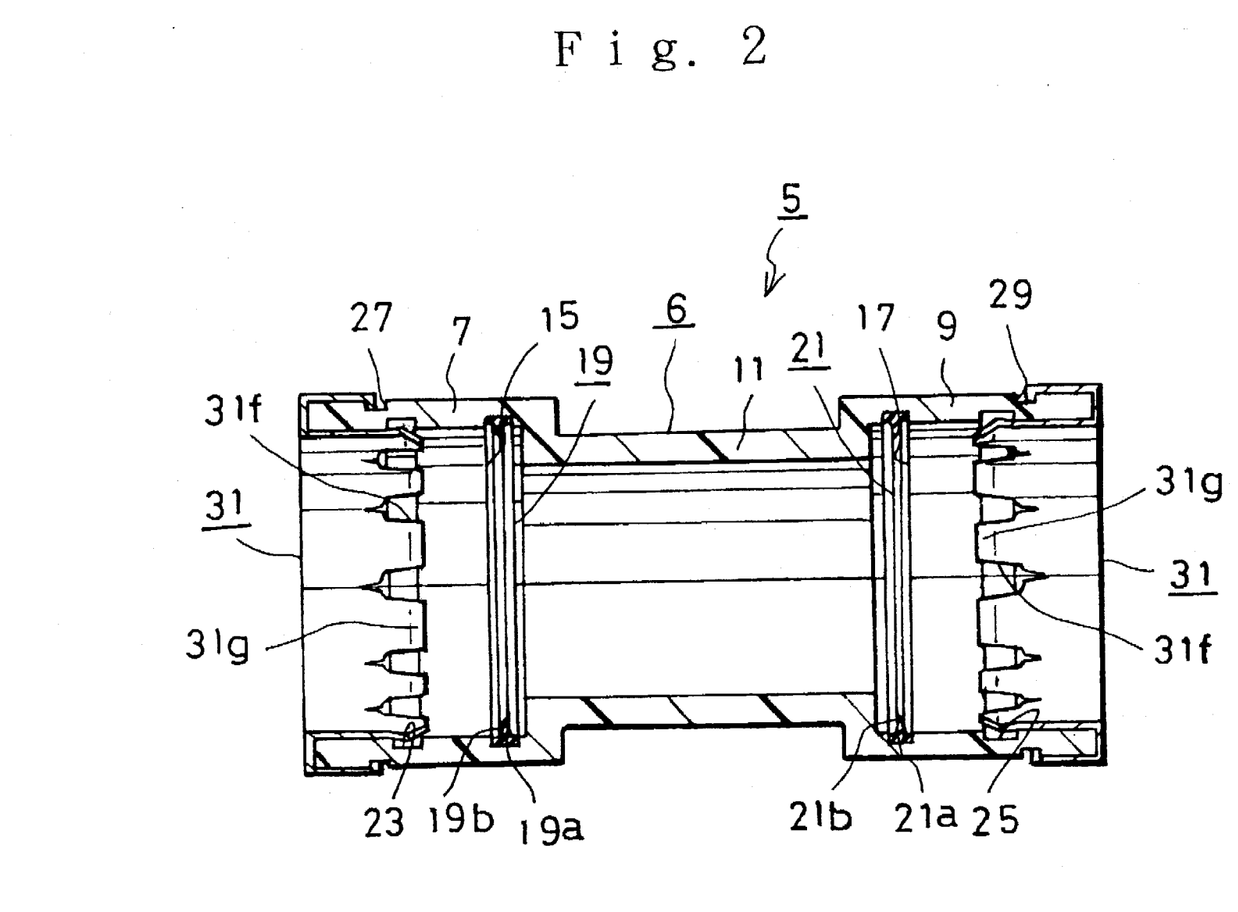
FIG. 2 is a longitudinally sectional view of said tubular joint.
Figure 3:
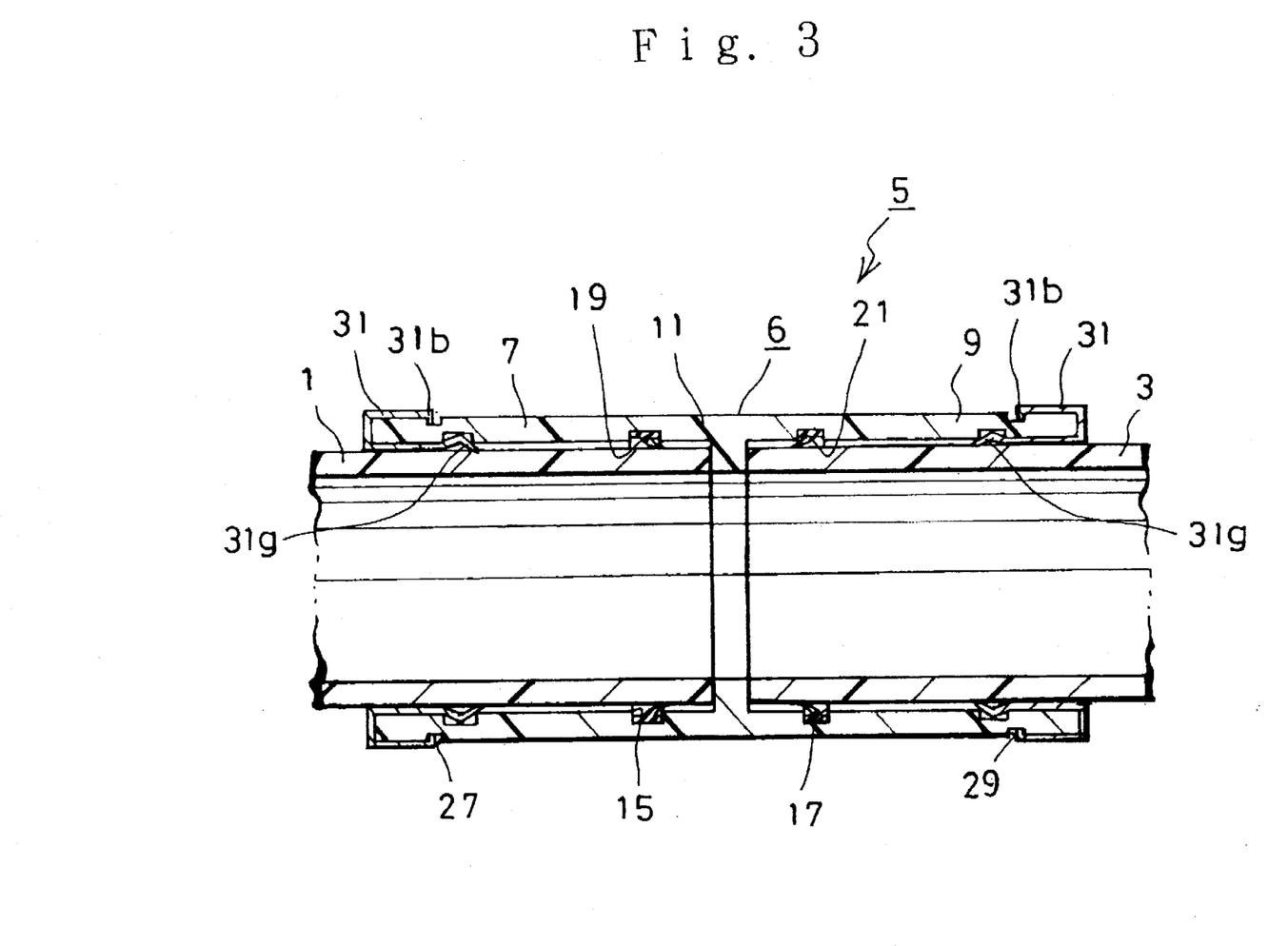
FIG. 3 is a longitudinally sectional view showing a modified embodiment of said tubular joint.
Figure 4:
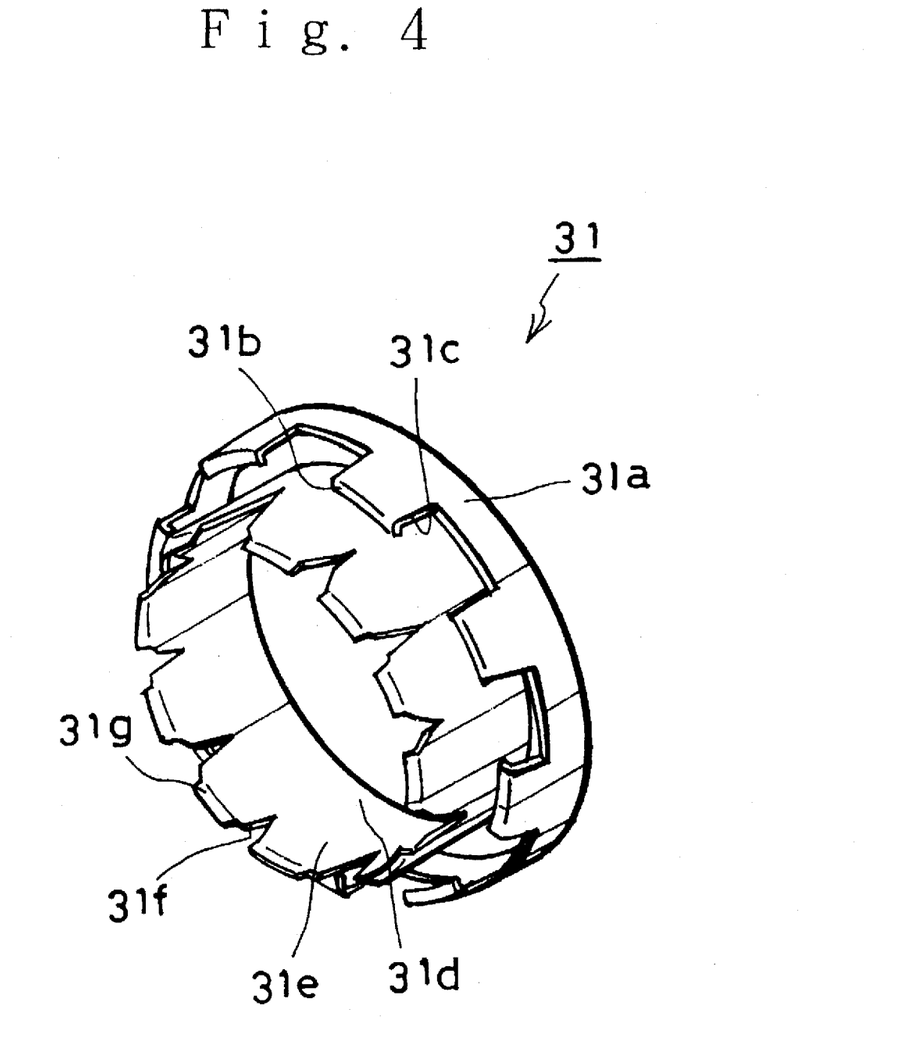
FIG. 4 is a perspective view of a fall-out preventing member.

In FIG. 1 to FIG. 4, a joint body 6 of a tubular joint 5 which mutually connects synthetic resin tubes 1 and 3 having an appointed inner diameter and an appointed outer diameter is made of synthetic resin which may be identical to the material of said tubes 1,3 or different therefrom and is formed integrally with connection ports 7, 9 and a tubular connection part 11 which connects said connection ports 7,9 to each other. Each of said connection ports 7,9 is made so as to have an inner diameter which is slightly larger than the outer diameter of said tubes 1,3 and at the same time said tubular connection part 11 is formed so as to have an inner diameter which is almost coincident with the inner diameter of said tubes 1,3. Furthermore, although the joint body 6 is constructed so that the same is connected by a tubular connection part 11, the inner diameter of which is different from that of said connection ports 7,9, as shown in FIG. 3, a tubular joint 5 may be such that said connection ports 7,9 are connected to each other by a tubular connection part 11, the outer diameter of which is almost equal to that of said connection ports 7,9, and at the same time staged end connection part 13 having a height almost equal to the inner diameter of tubes 1,3 is formed around the axial line on the inner circumferential face at the middle part in the axial direction of the tubular connection part 11.

Attaching recesses 15,17 are formed entirely around the axial line on the inner circumferential face of the connection parts 7,9 at the tubular connection 11 side, and sealing members 19,21 are formed of an elastically deformable elastomer resin integrally in the respective attaching recesses. Said sealing members 19,21 are composed by causing ring-like members 19a,21a filled in the attaching recesses 15,17 and sealing lugs 19b,21b having a length protruding from the inner circumferential face of the connection ports 7,9 on the inner circumferential face of said ring-like members 19a,21a to be formed integrally with each other. Either a method of simultaneous multi-tier molding when forming a tubular joint 5 or a method of secondary molding onto a tubular joint 5 molded in advance may be adopted as a molding pattern of said sealing members 19,21. Furthermore, the sealing members 19,21 shown in the same drawing are those which are provided with a single sealing lug 19b or 21b. It is needless to say that a plurality of sealing lugs may be formed integrally with said sealing member 19 or 21.

Figure 14:
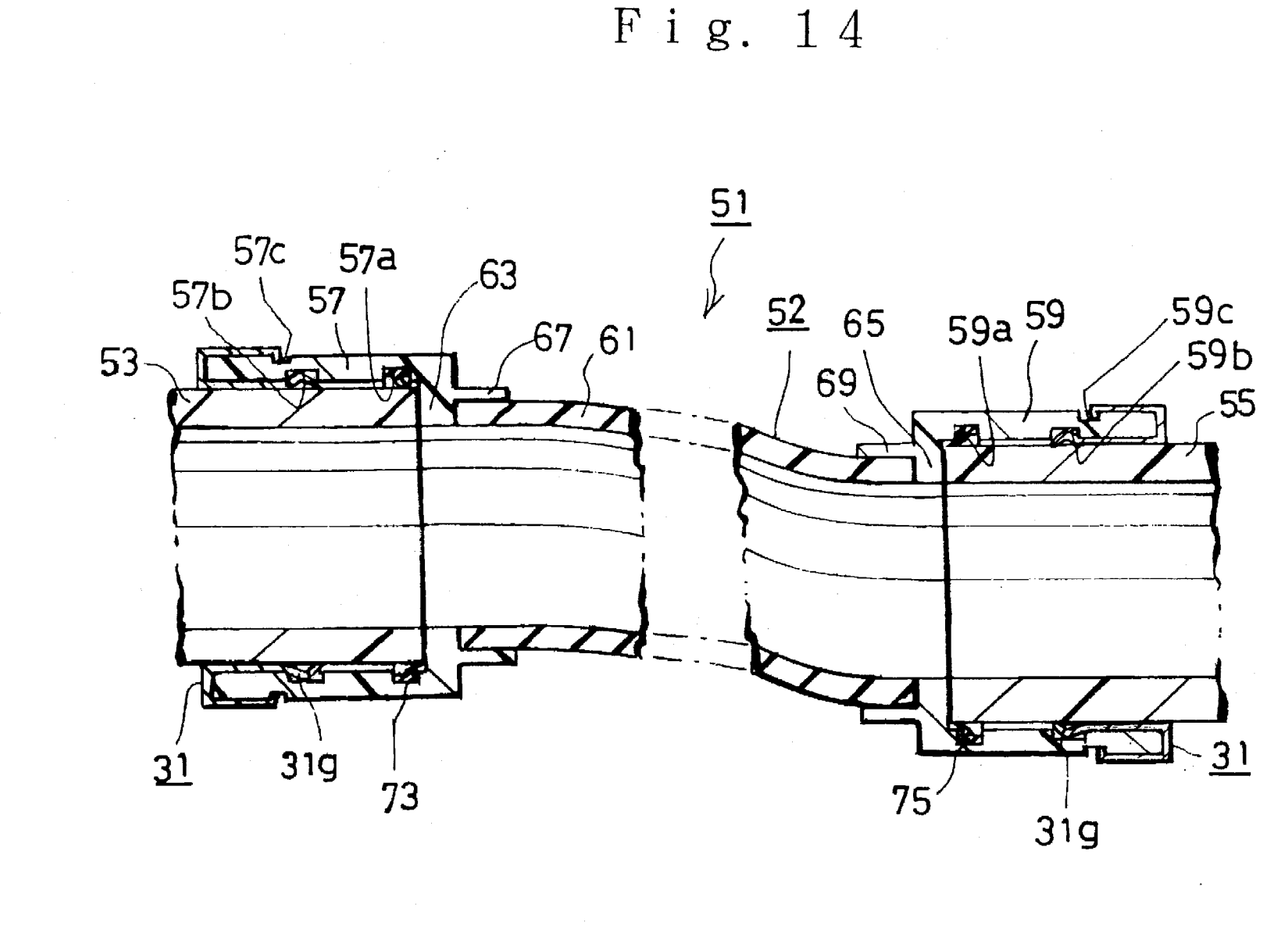
FIG. 14 is a partially enlarged longitudinally sectional view showing a connected state of a tube and a tubular joint.

Recesses 23,25 are formed entirely around the axial line on the inner circumferential face at the end side of the respective connection ports 7,9 and parts to be engaged 27,29 are also formed entirely around the axial line on the outer circumferential face at the point which is almost coincident with said recesses 23,25. Fall-out preventing members 31,31 are attached to the end part of the respective connection ports 7,9. As shown in FIG. 14, said fall-out preventing members 31,31 are such that an elastically deformable stainless steel thin plate is press-formed to be of a double-cylindrical shape insertable in said connection ports 7,9, a number of protrusion lugs 31b extending along the outer circumferential face of the tubular joint 5 to reach the parts 27,29 to be engaged, are integrally formed with notched parts 31c provided therebetween around the axial line, and the leading edge of each of said protrusion lugs 31b is folded to be engaged with the part 27,29. Furthermore, a method of causing the leading edges of protrusion lugs 31b to be engaged with the parts 27,29 is able to be achieved by folding the leading edge of the protrusion lugs 31b so as to be engaged with the parts 27,29 or folding the protrusion lugs 31b located at the parts 27,29.

On the other hand, a number of protrusion jugs 31e extending along the inner circumferential face of said tubular joint 5 to reach the recesses 23,25 are integrally formed at the inside cylindrical part 31d of the respective fall-out preventing member 31 with notched parts 31f provided therebetween around the axial line, and claws 31g are formed at the leading edge of the respective protrusion jugs 31e. The leading edge of each of the claws 31g is sharp and is folded to be oblique toward the tubular connection part 11 side and the center side thereof.

Next, a description is given of a connection method of mutual tubes by a tubular joint.

Figure 5:
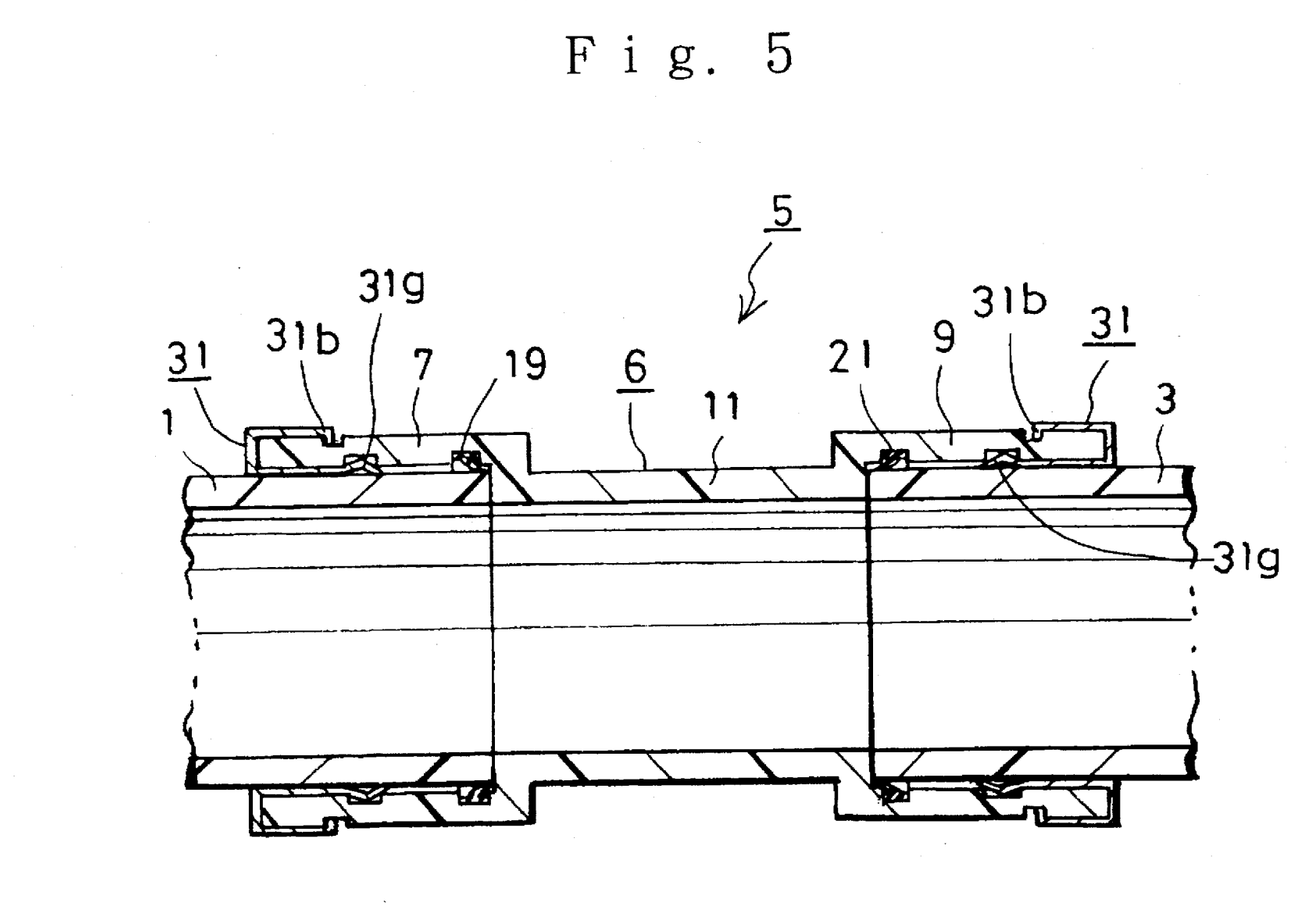
FIG. 5. is a longitudinally sectional view showing a connected state of tubes.
Figure 7:
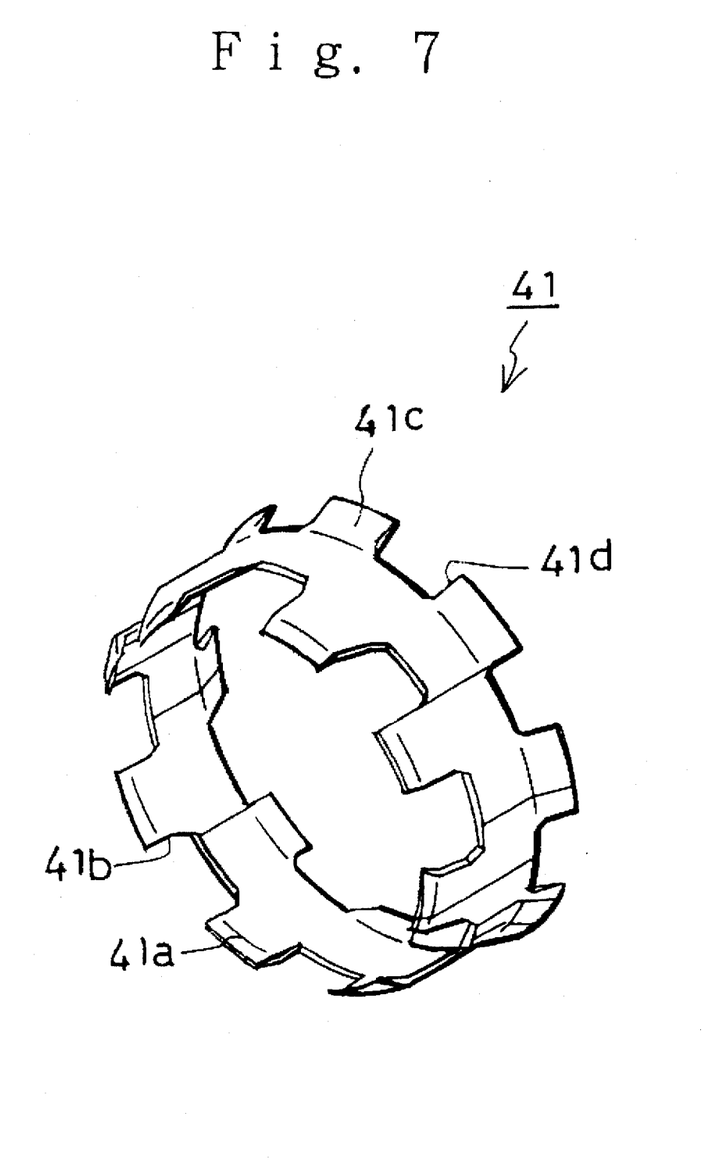
FIG. 7 is a perspective view showing a modified example of said fall-out preventing member.

In FIG. 5 and FIG. 7, if one connection port 7 at the tubular joint 5 is inserted relative to the end face at one tube 1 so that the end face of the one tube 1 is brought into contact with a staged part located at the boundary between the tubular connection part 11 and the connection port 7, as shown in FIG. 5, the sealing lug 19b of sealing member 19 is brought into contact with the outer circumferential face of the tube 1 under pressure while the same is making elastic deformations, whereby the airtightness between the tube 1 and the tubular joint 5 is maintained. At this time, since the claw 31g of the fall-out member 31 is inclined in the insertion direction of the tube 1, the same is elastically deformed in the diameter-swelling direction in the recess 23 in line with the insertion thereof, thereby enabling the insertion. On the other hand, after the insertion is completed, the claw 31g is brought into contact with the outer circumferential face under pressure due to elasticity return, thereby causing the inserted state to be maintained. The end part of the other tube 3 is inserted, as in the above, in the other connection port 9 in the tubular joint 5 attached to the other tube 1, whereby the tubes 1,3 are able to be connected to each other.

Figure 6:
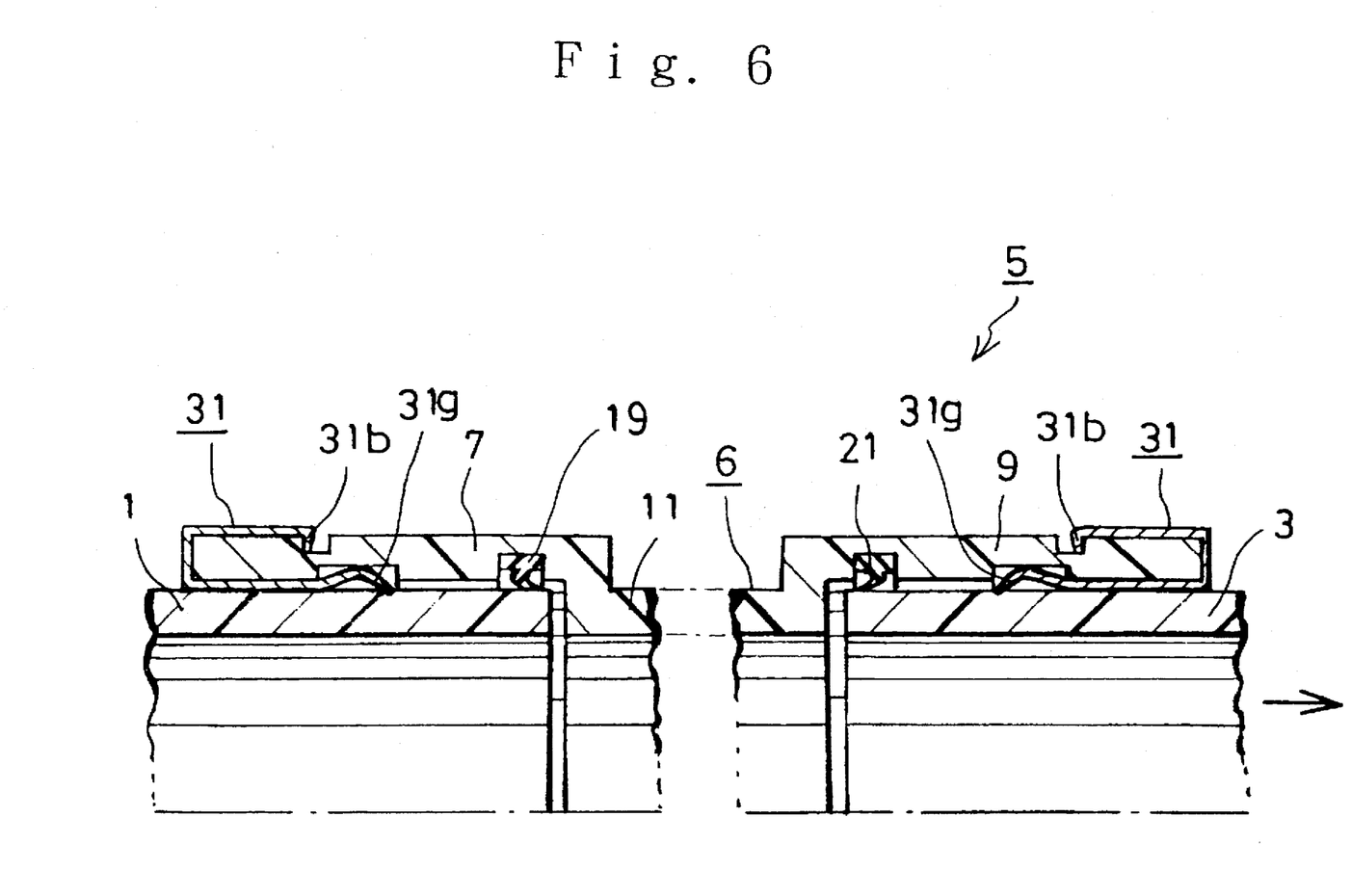
FIG. 6 is a partially enlarged longitudinally sectional view showing a fall-out stopped state.

Next, in the above connected state, when a force operates on the tubes 1,3 and tubular joint 5 in such a direction that they are separated from each other, the leading edge of the claws 31g of the fall-out preventing member 31 are engaged with the outer circumferential face of the tubes 1,3 in line with the force operating as shown in FIG. 6 since the claw 31g is brought into contact with the outer circumferential face of the tubes 1,3 in such a state that the claw 31g is inclined in the direction opposite to the separation direction, whereby the leading edge thereof is prevented from being separated from the tubes 1,3 and their connected state is able to be maintained.

A fall-out preventing member shown in FIG. 7 may be used as a fall-out preventing member 31 attached to the connection ports 7,9 of the tubular joint 5. That is, a fall-out preventing member 41 is made of a metallic thin plate such as elastically deformable stainless steel, etc., and is formed to be cylindrical so as to have a size equivalent to the inner circumferential face of the connection port 7,9, wherein a number of claws 41a are integrally formed at the end part at the tubular connection part 11 side, with notched parts 41b provided therebetween, so that the leading edges of the claws 41a are inclined toward the tubular connection part 11 side and the center side. Furthermore, a number of engaging lugs are folded in the radial direction at the end part at the connection side and notched parts 41d are formed integrally with the engaging lugs 41d therebetween. The fall-out preventing member 41 is prevented from coming off by the engaging lugs 41c being engaged in the wall face of the recesses 23,25 when they are inserted in the recesses 23,25 formed on the inner circumferential face of the connection port 7,9.

Figure 8:
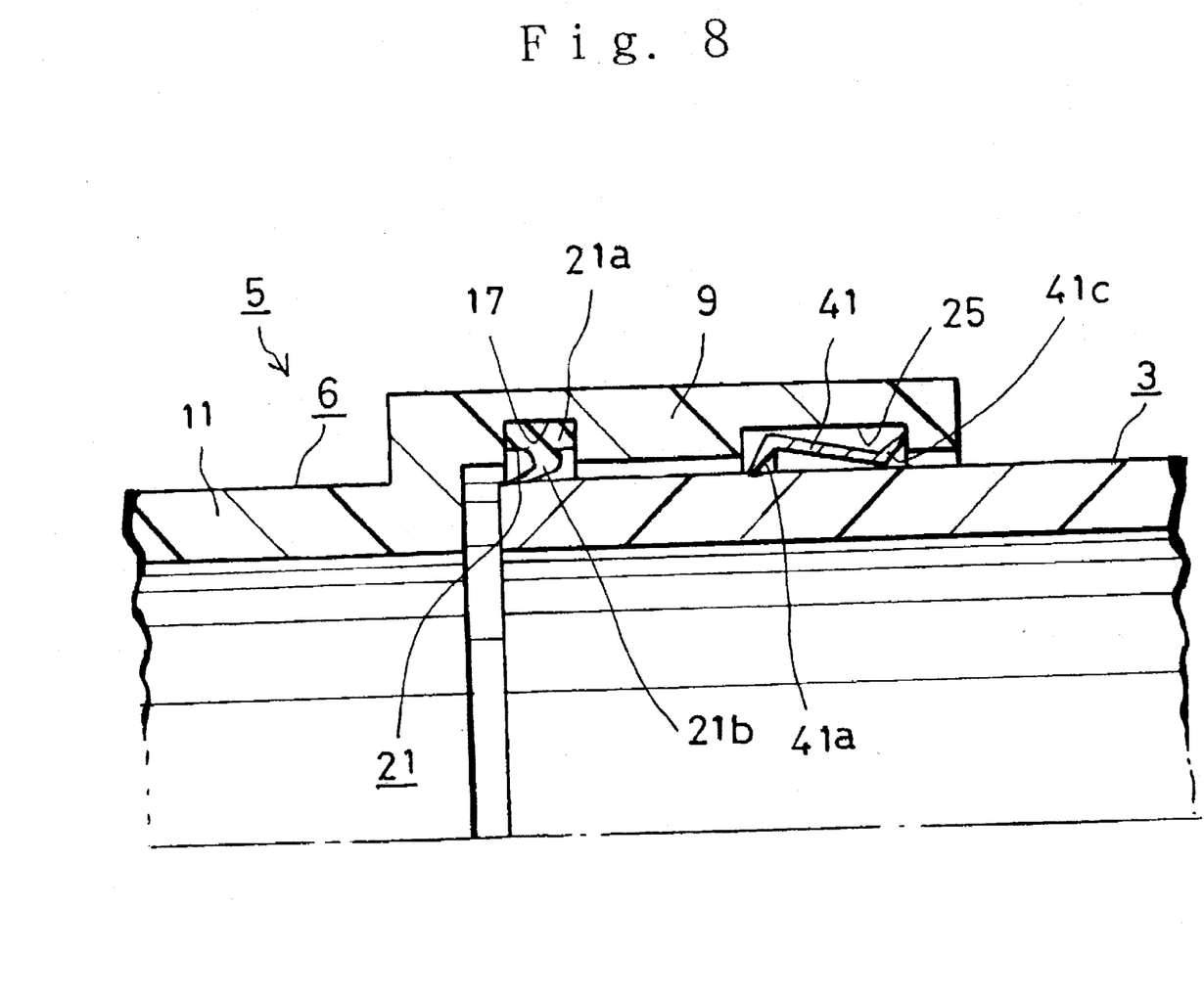
FIG. 8 is a partially enlarged longitudinally sectional view showing a fall-out stopped state.
Figure 9:
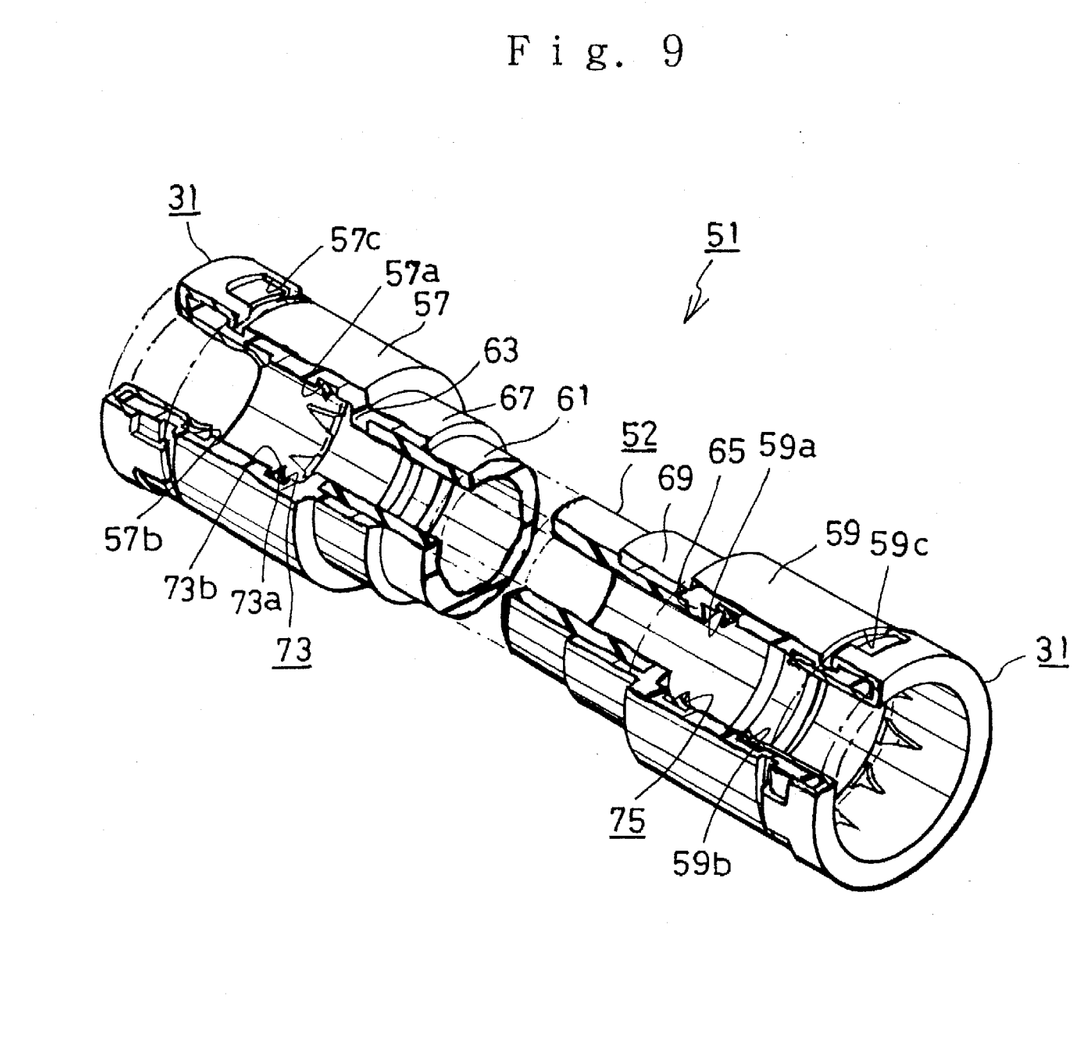
FIG. 9 is a perspective view of an entire tubular joint.
Figure 10:
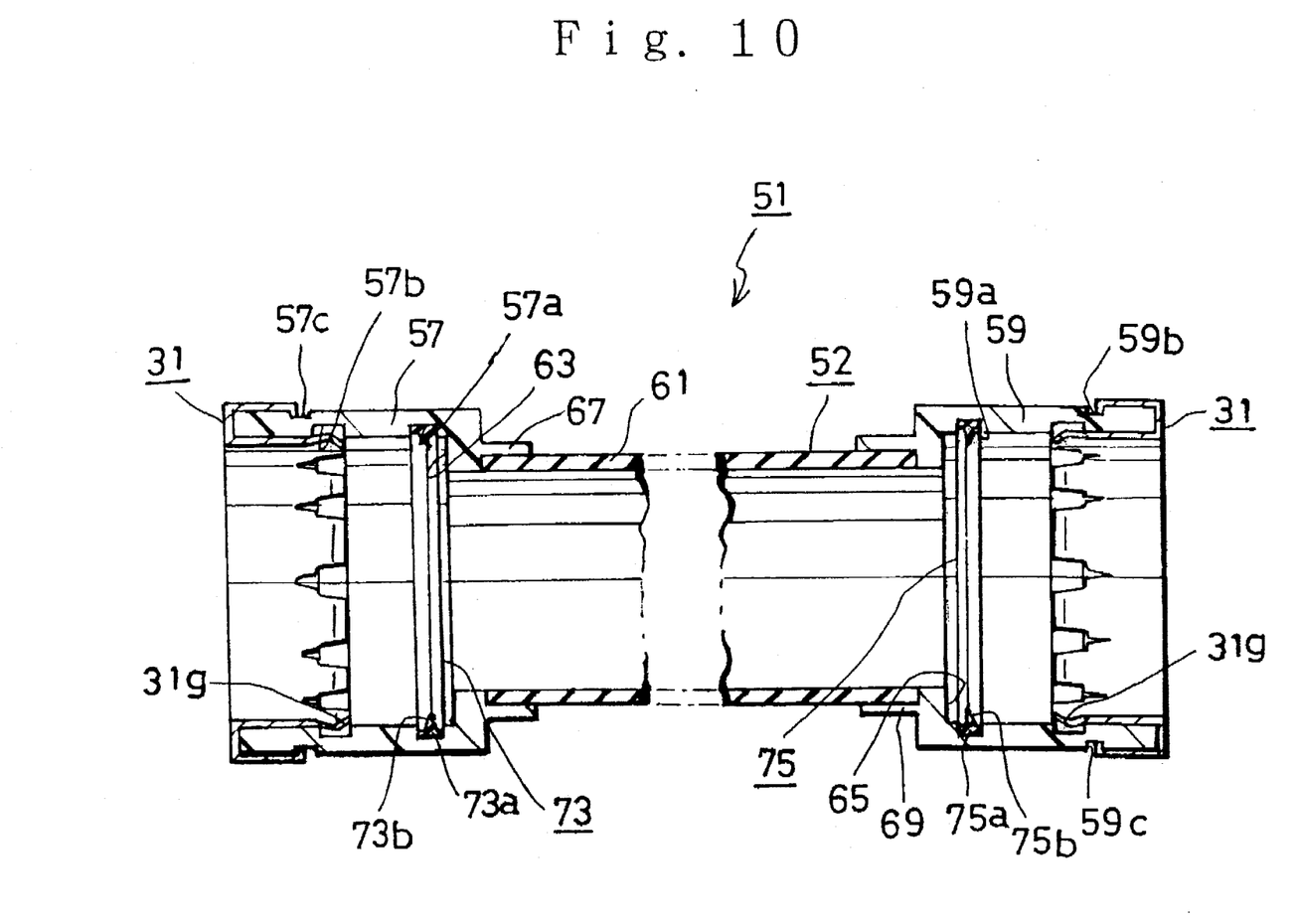
FIG. 10 is a longitudinally sectional view taken along the line II—II in FIG. 9.

As shown in FIG. 8, the fall-out preventing member 41 prevents the tubes 1,3 and tubular joint 5 from coming off by the claws 41a which are fitted to the outer circumferential face of the tubes 1,3 under pressure causing the leading edge thereof to be engaged in the outer circumferential face of the tubes 1,3 in line with the acting force when a force operates on the tubes 1,3 and tubular joint 5 in their separating direction.

Preferred Embodiment 2

In FIG. 9 through FIG. 13, the joint body 52 of a tubular joint 51 is comprised of connection ports 57,59, the inner diameter of which is slightly larger than the outer diameter of tubes 53,55 to be connected and an elastic connection tube 61 which causes the connection ports 57,59 to be connected to each other.

The connection ports 57,59 are formed of synthetic resin of a material which may be identical to or different from that of the tubes 53,55, and staged parts 63,65 whose inner diameter is almost equal to the inner diameter of the tubes 53,55 are integrally formed entirely around the axial line on the inner circumferential face almost at the middle part in the axial direction thereof. Furthermore, cylindrical fixing parts 67,69 whose inner diameter is larger than the inner diameter of tubes 53,55 are integrally formed at the connection ports 57,59 opposite to the connection side.

Figure 11:
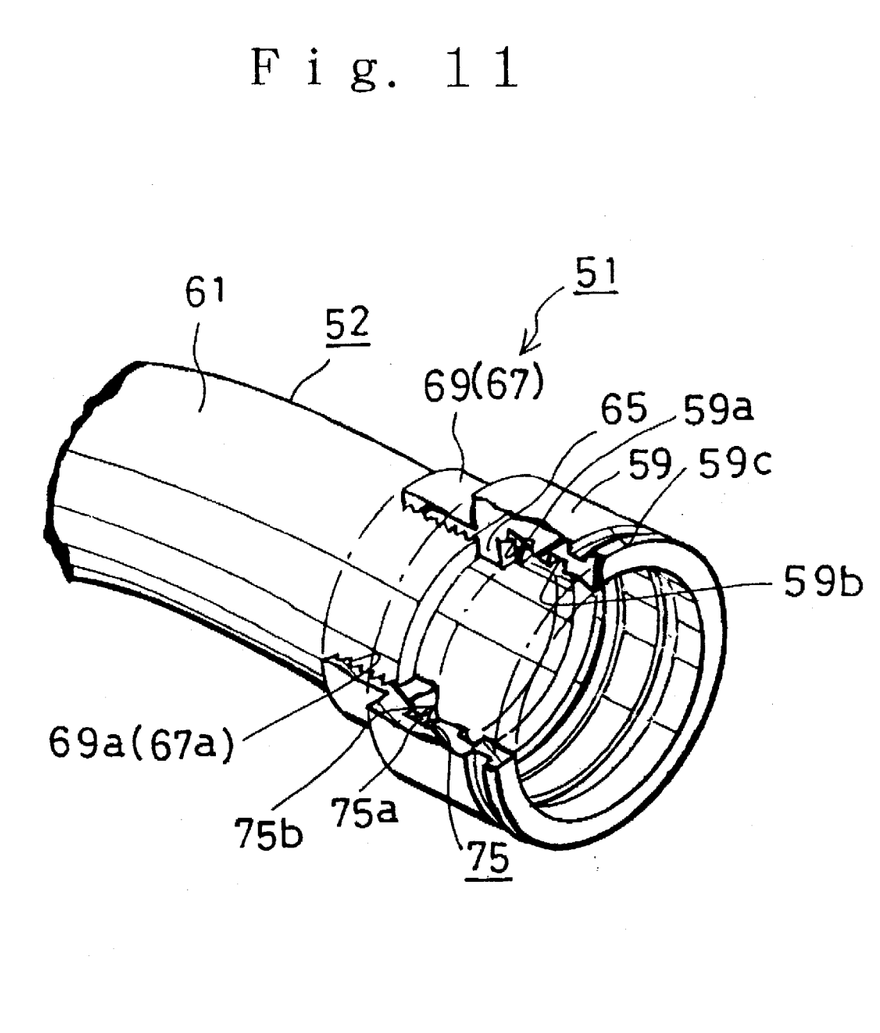
FIG. 11 is a partially broken perspective view showing a fixed state of an elastic connection tube.
Figure 12:
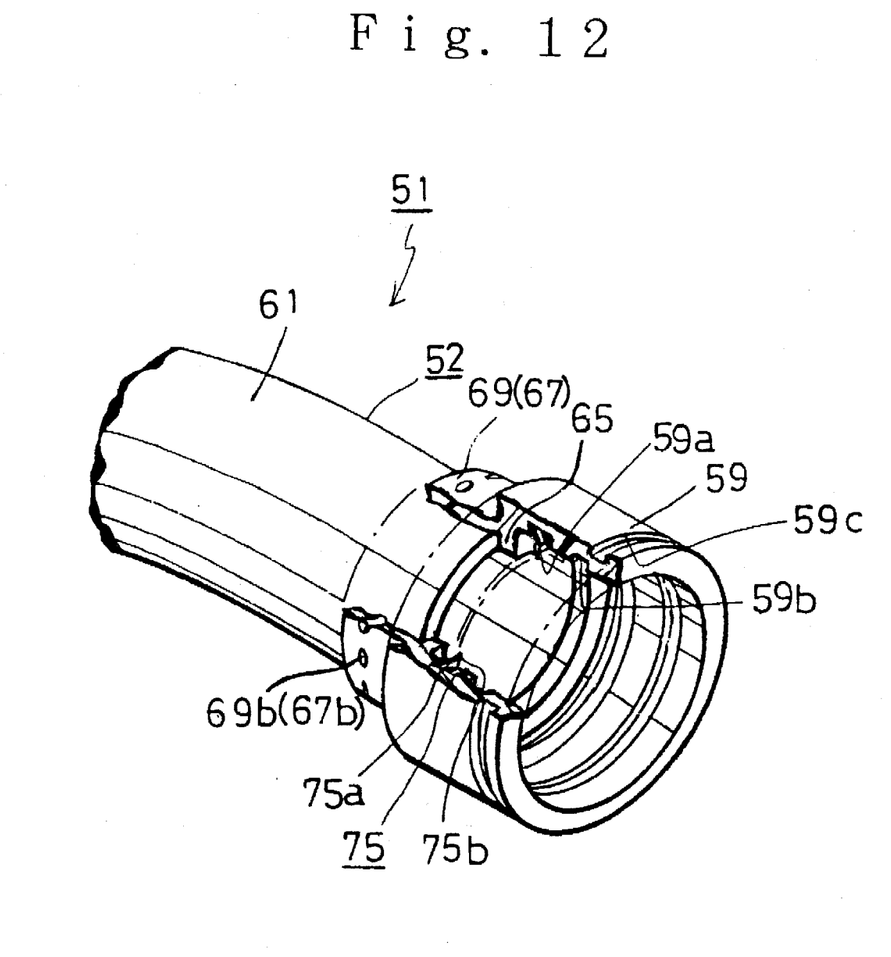
FIG. 12 is a partially broken perspective view showing a fixed state of an elastic connection tube.
Figure 13:
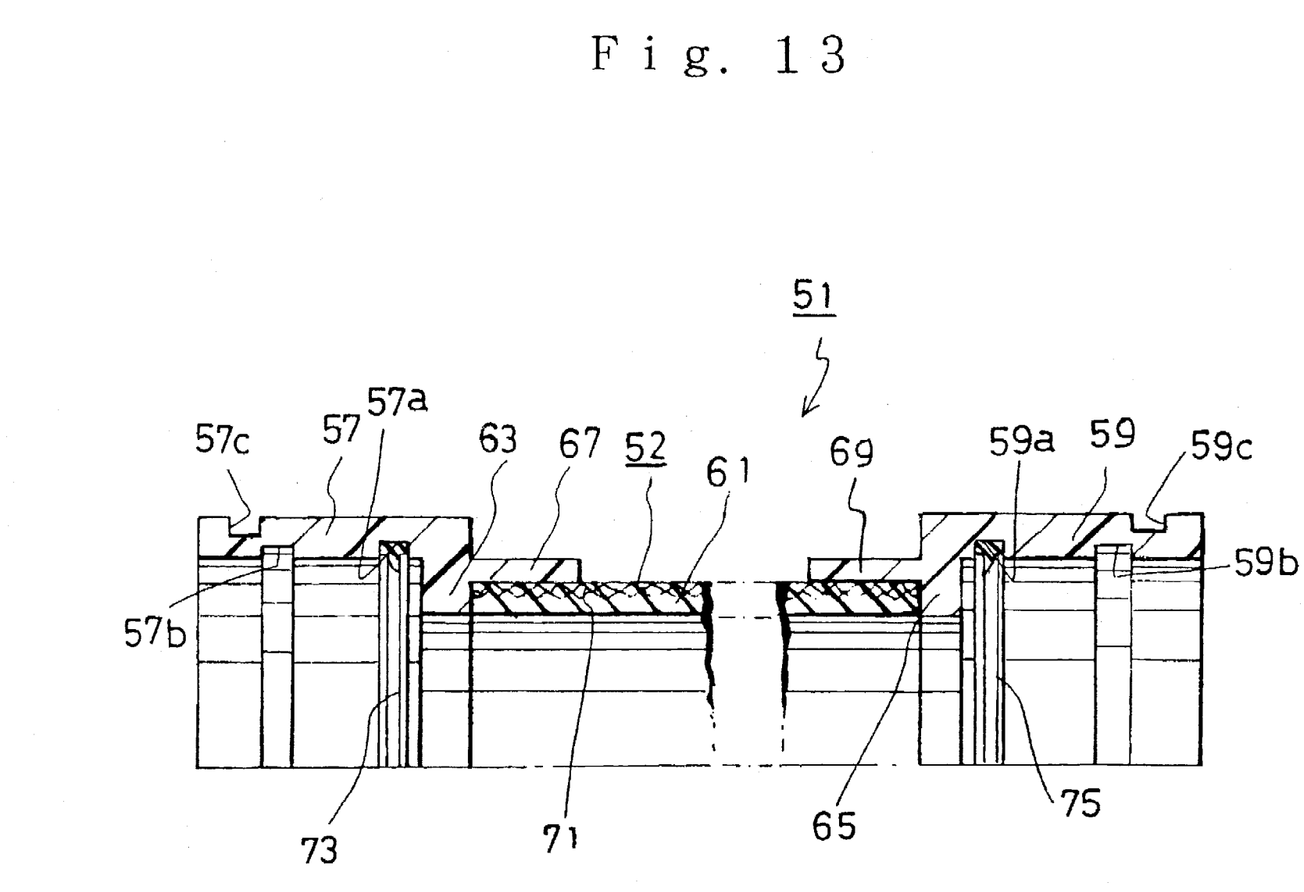
FIG. 13 is a partially longitudinal sectional view showing a modified example of an elastic connection tube.

An elastic connection tube 61 whose thickness is almost coincident with that of the staged parts 63,65 is integrally formed on the inner circumferential face of the respective fixing parts. That is, the elastic connection tube 61 is molded by welding the same by extruding elastomer resin between the fixing parts 67,69. When secondarily molding the elastic connection tube 61 on the fixing parts 67,69, a number of concave and convex parts 67a, 69a are formed on the inner circumferential face of the respective fixing parts 67,69 as shown in FIG. 11, in order to cause the adhering area to be made wider, and a plurality of holes 67b,69b are formed at the respective fixing parts 67,69 as shown in FIG. 12 in order to cause a part of the extruded elastomer resin to be filled up in the holes 67b,69b, thereby causing both of them to be firmly adhered to each other. Furthermore, as shown in FIG. 13, an elastic connection tube 61 may be secondarily molded by extruding elastomer resin in such a state that reinforcing meshing fibers 71 such as cylindrically woven metallic fibers, fabric threads or carbon fibers, etc. are provided between the fixing parts 67,69, whereby even though an elastic connection tube 61 is bent, the same is able to maintain its pipe-like shape and the same is able to endure the pressure of fluid flowing therein. Furthermore, although the abovementioned elastic connection tube 61 is integrally formed at the inner circumferential side of the fixing parts 67,69, the same may be integrally molded so as to put the fixing parts 67,69 therebetween and the same may be made coincident with the outer circumferential face of the connection ports 57,59.

Attaching recesses 57a,59a are formed around the axial line on the inner circumferential face at the nonconnection side of the respective connection ports 57,59, and sealing members 73,75 are integrally molded in the respective attaching recesses 57a,59a. Each sealing member 73 or 75 is formed in such a manner that sealing lugs 73b,75b having a length protruding from the inner circumferential face of the connection ports 57,59 are integrally formed on the inner circumference of ring-like members 73a,75a filled up in the attaching recesses 57a,59a, and elastomer resin is extruded in the attaching recesses 57a,59a to cause the sealing members 73,75 to be welded therein. Furthermore, the sealing members 73,75 may be simultaneously molded when secondarily molding the elastic connection tube 61 at the connection ports 57,59.

Recesses 57,59 are formed around the axial line on the inner circumferential face at the connection side at the respective connection ports 57,59 and parts 57c,59c to be engaged are formed around the axial line on the outer circumferential face at a point which is almost coincident with the respective recesses 57,59. A fall-out preventing member 31 is inserted into the connection side edge part of the respective connection ports 57,59.

Each fall-out preventing member 31 is similar to the fall-out preventing member 31 described in the first preferred embodiment. Therefore, the same reference number is given, and the description thereof is omitted herein. Furthermore, although the drawings show fall-out preventing members 31, fall-out preventing members 41 shown in FIG. 7 may be also used.

Next, a description is given of a method for connecting tubes 53,55 to each other by a tubular joint 51 to which the fall-out preventing members are attached.

Figure 15:
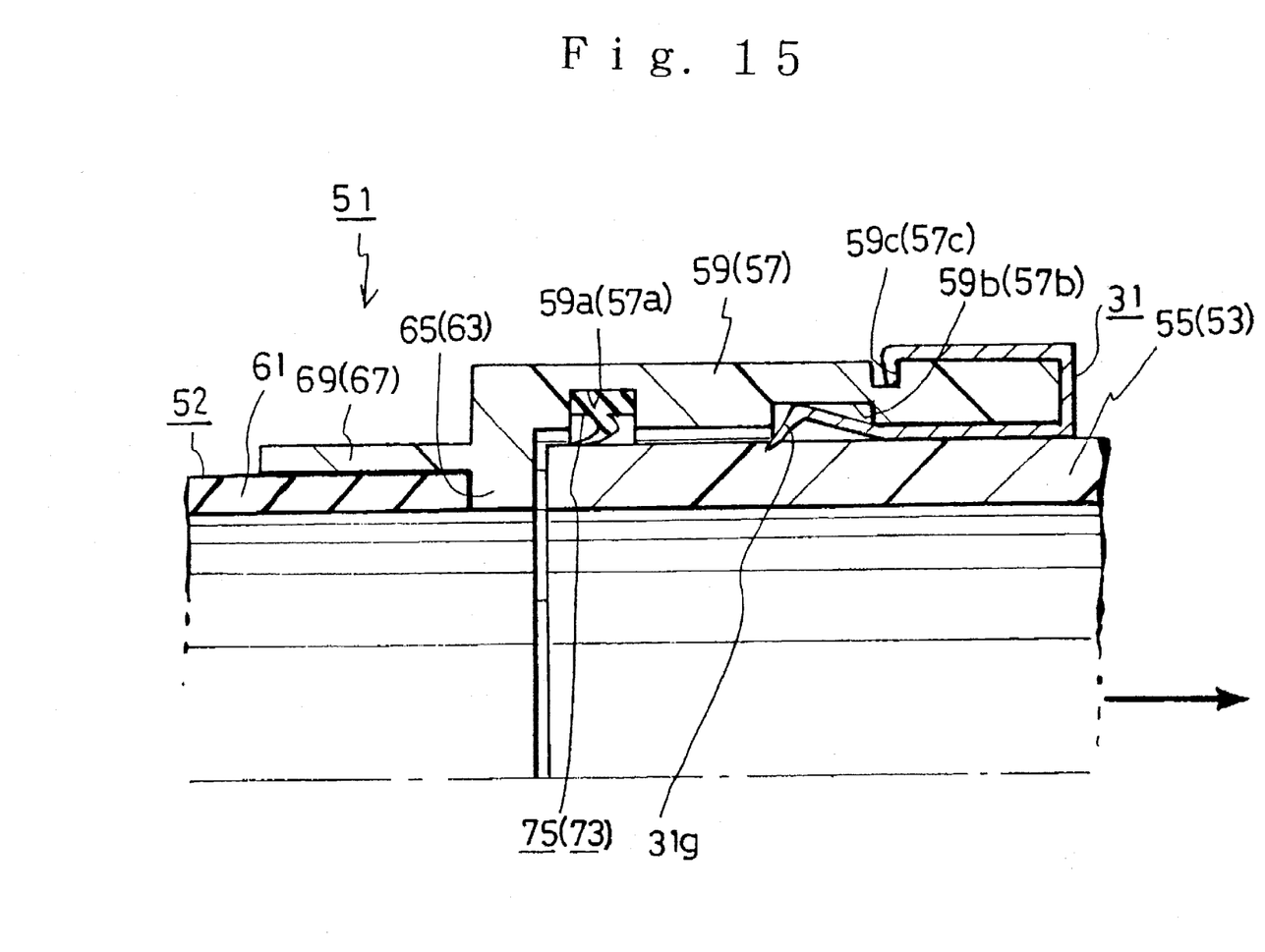
FIG. 15 is a partially enlarged longitudinally sectional view showing a fall-out stopped state.

In FIG. 14, and FIG. 15, in a case where tubes 53,55 separated from each other, the axial lines of which are not aligned with each other, are connected to each other, the respective tubes 53,55 are connected to each other by inserting the connection ports 57,59 of said tubular joint 51 while an elastic connection tube 61 is elastically deformed relative to the end parts thereof according to the separated or spaced state of tubes 53,55. At this time, claws 31g of the respective fall-out preventing members 31 are elastically deformed in the diameter-swelling direction in the recesses 57b,59b in line with insertion thereof into the end parts of the tubes 53,55, whereby the insertion thereof is enabled, and on the other hand, the claws 31g are fitted to the outer circumferential face at the end parts of the tubes 53,55 by an elastic returning force after the insertion is completed. Furthermore, sealing members 73,75 are made airtight by sealing lugs 53b,75b pressure-fitted to the end part outer circumferential face of the tubes 53,55 when the insertion is finished.

When a force operates on the tubes 53,55 and tubular joint 51, which are thus connected to each other, in a direction of separating them from each other, the claws 31g pressure-fitted to the outer circumferential face of the tubes 53,55 to cause the leading edge thereof to be caught in the outer circumferential face of the tubes 53,55 in line with the force described above, thereby causing the tubes 53,55 and tubular joint 51 to be prevented from being separated from each other and causing their connection to be maintained.

In the above description, although the tubular joint 51 is composed so that connection ports 7,9,57,59 are provided at both the ends of the tubular connection part 11 and elastic connection tube 61, the tubular connection part 11 and elastic connection tube 61 may be either of Y-shape, cross-shape, or any shape having any desired curvature, which is provided with three or more connection ports.

What is claimed is:

1. A tubular joint comprising:

at least a pair of connection ports having an inner diameter substantially equivalent to an outer diameter of tubes to be connected;

a tubular connection part connecting said connection ports to each other;

said connection ports each having a sealing member formed integrally thereon by extruding elastomer resin into a first recess formed around an axial line on an inner circumferential face of said connection ports; and said connection ports each having a fall-out preventing member coupled to an end part of said connection ports, said fall-out preventing member comprising a ring-like member having an outer diameter sized for insertion into said connection ports, and said fall-out preventing member including a number of claws having leading edges located in a second recess formed around the axial line on the inner circumferential face of said connection ports and extending toward a center of said connection ports;

wherein when a tube is inserted into one of said connection ports, said claws slidably contact an outer circumferential face of the tube and are elastically deformed in a diameter-swelling direction to thereby enable insertion of the tube, whereupon said claws are brought into contact with the outer circumferential face of the tube due to an elasticity return pressure to thereby prevent the inserted tube from falling out of said one of said connection ports, said sealing member being simultaneously brought into contact with the outer circumferential face of the inserted tube to thereby achieve an airtight coupling between the inserted tube and said one of said connection ports.

2. A tubular joint as set forth in claim 1, wherein said fall-out preventing member further comprises an outside cylindrical portion on a side of said ring-like member opposite to said claws, said outside cylindrical portion being inserted on the outer circumferential face of the end of the connection ports and having a plurality of engaging parts which engage with a groove formed around an axial line on the outer circumferential face of said connection ports.

3. A tubular joint as set forth in claim 1, wherein said fall-out preventing member further comprises a plurality of engaging parts on a side of said ring-like member opposite to said claws, said engaging parts extending in a radial direction to engage with the second recess formed around the axial line on the inner circumferential face of said connection ports.

4. A tubular joint comprising:

at least a pair of connection ports having an inner diameter substantially equivalent to an outer diameter of tubes to be connected;

a tubular connection part connecting said connection ports to each other, said tubular connection part being formed integrally by extruding elastomer resin between said connection ports;

said connection ports each having a sealing member formed integrally thereon by extruding elastomer resin into a first recess formed around an axial line on an inner circumferential face of said connection ports; and said connection ports each having a fall-out preventing member coupled to an end part of said connection ports, said fall-out preventing member comprising a ring-like member having an outer diameter sized for insertion into said connection ports, and said fall-out preventing member including a number of claws having leading edges located in a second recess formed around the axial line on the inner circumferential face of said connection ports and extending toward a center of said connection ports;

wherein when a tube is inserted into one of said connection ports, said claws slidably contact an outer circumferential face of the tube and are elastically deformed in a diameter-swelling direction to thereby enable insertion of the tube, whereupon said claws are brought into contact with the outer circumferential face of the tube due to an elasticity return pressure to thereby prevent the inserted tube from falling out of said one of said connection ports, said sealing member being simultaneously brought into contact with the outer circumferential face of the inserted tube to thereby achieve an airtight coupling between the inserted tube and said one of said connection ports.

5. A tubular joint as set forth in claim 4, wherein said fall-out preventing member further comprises an outside cylindrical portion on a side of said ring-like member opposite to said claws, said outside cylindrical portion being inserted on the outer circumferential face of the end of the connection ports and having a plurality of engaging parts which engage with a groove formed around an axial line on the outer circumferential face of said connection ports.

6. A tubular joint as set forth in claim 5, wherein said fall-out preventing member further comprises a plurality of engaging parts on a side of said ring-like member opposite to said claws, said engaging parts extending in a radial direction to engage with the second recess formed around the axial line on the inner circumferential face of said connection ports.

* * * * *